United States Patent [19]
Shiels et al.

[11] Patent Number: 5,737,527
[45] Date of Patent: Apr. 7, 1998

[54] INTERACTIVE ENTERTAINMENT APPARATUS

[75] Inventors: Martin A. Shiels, Bristol; Richard S. Cole, Redhill; Paul J. Rankin, Horley; Rosa Freitag, London, all of England

[73] Assignee: U.S. Philips Corporation, New York, N.Y.

[21] Appl. No.: 705,888

[22] Filed: Aug. 29, 1996

[30] Foreign Application Priority Data

Aug. 31, 1995 [GB] United Kingdom ............... 9517788

[51] Int. Cl.$^6$ .................................................. G06F 17/00
[52] U.S. Cl. .......................................... 395/200.09
[58] Field of Search ......................... 395/200.09, 173; 364/514 A, 514 R; 273/429, 430; 463/30, 31; 455/5.1; 348/13, 16; 434/308, 311, 323

[56] References Cited

U.S. PATENT DOCUMENTS

| | | | |
|---|---|---|---|
| 3,318,517 | 5/1967 | Wells | 235/52 |
| 4,305,131 | 12/1981 | Best | 364/521 |
| 4,333,152 | 6/1982 | Best | 364/521 |
| 4,445,187 | 4/1984 | Best | 364/521 |
| 4,569,026 | 2/1986 | Best | 364/521 |
| 4,846,693 | 7/1989 | Baer | 434/308 |
| 5,077,607 | 12/1991 | Johnson et al. | 348/13 |
| 5,161,034 | 11/1992 | Klappert | 358/342 |
| 5,377,997 | 1/1995 | Wilden et al. | 273/434 |
| 5,417,575 | 5/1995 | Mctaggart | 434/308 |
| 5,581,479 | 12/1996 | McLaughling et al. | 364/514 A |
| 5,611,694 | 3/1997 | Bromley | 434/311 |
| 5,634,849 | 6/1997 | Abecassis | 463/30 |

FOREIGN PATENT DOCUMENTS

| | | |
|---|---|---|
| B7270987 | 1/1991 | Australia. |
| B3595889 | 8/1991 | Australia. |
| WO9208531 | 5/1992 | WIPO. |
| WO9413105 | 6/1994 | WIPO. |
| WO9417886 | 8/1994 | WIPO. |
| WO9427677 | 12/1994 | WIPO. |

OTHER PUBLICATIONS

Furht et al.; "Design Issues for Interactive Television Systems"; Computer Magazine, May 1995.

"Interactive Entertainment Content Control", U.S. Serial No. 08/705,548.

"Interactive Entertainment Personalisation". U.S. Serial No. 08/705,887.

"Information Handling for Interactive Apparatus", U.S. Serial No. 08/705,584.

"Interacitve Entertainment Attribute Setting", U.S. Serial No. 08/705,889.

Primary Examiner—Ellis B. Ramirez
Attorney, Agent, or Firm—Debra K. Stephens

[57] ABSTRACT

Methods and apparatus are provided for user interaction with a branch-structured narrative entertainment, where user input influences the selection of paths at branch points. A user interface (14) holds a record of the narrative structure (48) with the audio and video components being called up from remote or local storage as required. A record is kept (52) of previous user interactions during a narrative and, for one or more branch points, path selection is made by the apparatus at least partially on the basis of the accumulated record.

20 Claims, 6 Drawing Sheets

INTERACTIVE ENTERTAINMENT APPARATUS

BACKGROUND OF THE INVENTION

1. Field of the Invention

The present invention relates to interactive entertainment systems and, in particular, to such systems in which the user is able to control, directly or indirectly, the path of a narrative or plot line.

2. Description of the Related Prior Art

An example of such a system is described in U.S. Pat. No. 4,305,131 to Robert M. Best, and comprises a motion picture system in which the viewer is treated as a character in the narrative. At branch points in the narrative, a character on screen will ask a question of the viewer: the viewer is provided with a hand held menu screen on which two or more command words appear, which words are amongst the limited vocabulary of a speech recognition unit of the system. The branch taken by the narrative will depend on how the viewer responds to the on-screen characters question, that is to say which of the command words is spoken by the viewer. The multiple story lines are held on optical disc as independently addressable video frames, blocks of compressed audio and/or cartoon graphics. A record retrieval circuit reads blocks of binary coded control information comprising a branching structure of digital points specifying the frame sequence for each story line. A dispatcher circuit assembles a schedule of cueing commands specifying precisely which video frames, cartoon frames and sections of audio are to be presented at which instant of time. A cueing circuit executes these commands by generating precisely timed video and audio signals.

A problem with the system of Best is that, for many of the branch points, the user interaction will tell the user what is going to happen in the following scene. A further drawback is that the apparatus is intended for only a single user.

An interactive system for multiple users is described in International patent application WO94/13105 to Interfilm Technologies Inc. The system is intended primarily for cinema environment applications where each member of an audience is provided with a polling unit. A branch structured story is played from videodisc and, at the appropriate points, the audience is invited to select the direction of the next branch. A central control unit provides for collation of the audience inputs and directs the next branch selection on the basis of the most popular selection.

Whilst the Interfilm audience polling system provides a way to handle multiple user inputs, like the Best apparatus it can suffer from the "obviousness" of the changes offered to the user.

SUMMARY OF THE INVENTION

It is an object of the present invention to provide an interactive entertainment apparatus for the home user, wherein the selection of branch narrative paths is made in an improved manner.

In accordance with the present invention there is provided an interactive entertainment apparatus operable to output sequences of image frames comprising a user-influenced path through a branch structured narrative, the apparatus comprising: a source of image frames for all branch structure paths of the narrative; branch storage means for data defining the narrative branch structure; user operable input means; branch selection means coupled to the branch store and operable to detect narrative branch points and to call one of two or more image frame sequences from the image frame source in dependence on the user input; and an output for the selected image frame sequences; characterised by interaction memory means arranged to receive and store data relating to user input, and in that the branch selection determined which of said two or more image frame sequences to call on the basis of at least two preceding and separate user inputs.

By maintaining a history of user inputs and referring to that history in branch selection, the likely result of any particular interaction is less obvious to for the user and the narrative flow is less susceptible to discontinuities.

The interaction memory means suitably comprises a non-volatile storage device, such as the memory of a smart card, and the apparatus may further comprise a smart card reader operable to access data stored in the memory of a smart card and to write data thereto.

In a pay-per-view or pay-per-play system, the received image data may be in encrypted form requiring one or more key codes for decryption. Accordingly, the apparatus may further include suitable decryption means coupled to receive such an encrypted signal and connected to access the required key code or codes which may suitably be stored on a smart card, such as that providing interaction memory storage.

Where the source of image frames to the apparatus provides sequences of video frames, an image generating means may be provided to generate image effects or artefacts overlying one more of the video frames when those frames are displayed: such artefacts may include system messages, masks, a cursor, menu bars and so forth. Audio effects may also be provided, for example to cue a user interaction.

Where the sequences of video frames are encoded according to a predetermined coding standard (such as MPEG), the apparatus may suitably further comprise a decoder coupled to receive and decode the sequences.

Where the source of image frames provides animation source data, an image generating means may be provided to generate and render successive animated image frames from that source data.

The apparatus may be configured to receive the image frames from different source arrangements. For example, the source may be a remote source coupled to the apparatus via a data transmission network, such as a local cable television network or video-on-demand (VoD) system, with the apparatus having the capability to generate and send messages requesting image data via such a network. Alternatively, the source of image frames may comprise an optical disc accessed via a disc reader, with the apparatus having the capability to control access of data from the disc by the reader. Combination of remote (networked) and local (disc) sources are also possible.

The present invention also provides a smart card for use with the apparatus as described above, the card having a write/read memory area including the interaction memory.

The present invention further provides an optical disc for use as the local source to an apparatus as described above, the disc carrying data defining the narrative structure, a plurality of image frame data segments arranged on the disc at predetermined locations and an addressing table specifying to the apparatus access addresses for each image frame data segment. Alternatively, the addressing table for the disc may be downloaded from a remote source where one is provided.

The present invention still further provides an interactive entertainment source apparatus operable to supply image frames to one or more apparatuses as described above, the source apparatus including means for monitoring and logging apparatus frame sequence calls for branch points of the interactive entertainment, means for determining the frame sequence to be sent on the basis of said frame sequence calls, and transmission means operable to transmit selected ones of the frame sequences. The source apparatus, suitably in the form of a network server, may comprise a counter arranged to determine numbers of requests for each particular one of alternate possible frame sequences, with the transmitted one of those frame sequences being determined by majority vote. The source means for monitoring and logging preferably maintains a record of two or more past branch point interactions and includes arithmetic means arranged to generate a weighting factor based thereon. Such a weighting factor would then be applied to vote shares prior to the determination as to which frame sequence is transmitted.

Also in accordance with the present invention there is provided a method for control of an interactive entertainment apparatus, where the apparatus presents to the user a branch structured narrative, and user input determines which path is followed at at least one narrative branch point, characterised in that, a history of user interactions is maintained and determination as to which path is followed at said at least one narrative branch point is made on the basis of two or more preceding and separate user interactions.

The history may be maintained for a predetermined number n of preceding user interactions, with the most recent n interactions forming said history. This not only limits the required storage space for the history, it also means that only the more recent (and relevant) interactions are taken into account. The user interactions may be classified into two or more categories, with a separate history being maintained for each category; with such categorisations, each branch point of the narrative may specify the category on the basis of which history path selection is to be made.

The history is suitably held in a non-volatile store, such as the smart card referred to above, and may be carried over successive operating periods of the apparatus. This avoids the need for a user to restart the narrative in order to re-assemble the history.

Further in accordance with the present invention there is provided a method of supplying an interactive narrative entertainment comprising the steps of: providing a branch structure for the narrative; making available sequences of image frames for each path of the branch structure; logging user requests for image frame sequences; and for each branch point for which one or more requests are made, determining which sequence is sent at least partially on a historical record of user interactions, and at least partially on the basis of the number of requests received. Thus, the making of choices on the basis of the interaction history may be provided at both the user apparatus and the source apparatus.

BRIEF DESCRIPTION OF THE DRAWINGS

Further features and advantages of the present invention will become apparent from reading of the following description of preferred embodiments of the present invention, given by way of example only, and with reference to the accompanying drawings in which.

DETAILED DESCRIPTION OF THE PREFERRED EMBODIMENTS

In the following example, we concentrate particularly on the case where the image frames accompanying the narrative are video frames, although as will be understood and as will be described, the present invention is equally applicable to sequences of animated image frames, and compound frames formed, for example, of a "blue-screened" video image character overlying a two or three dimensional computer graphics generated background.

Figure 1:
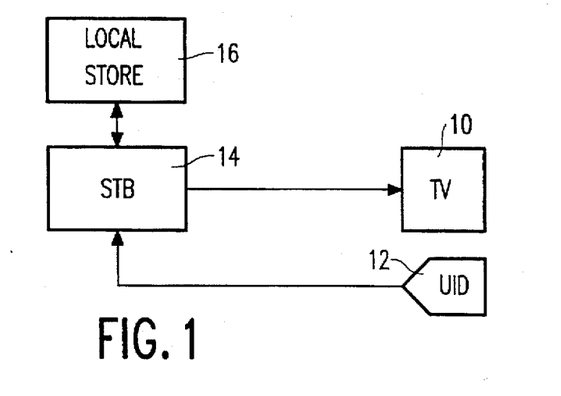
FIGS. 1 to 4 show differing combinations of material source supplying a user interface apparatus embodying the present invention.

FIGS. 1 to 4 represent a number of different ways by which an interactive narrative may be supplied to a user. In each case, the user views the received narrative on a monitor screen 10, suitably a television set, and is provided with an input device (UID) 12 for inputting commands, responses or other data as required by the particular application. In addition, the user is provided with an interface apparatus in the form of a set top box (STB) 14 to which the narrative source or sources are coupled, to which the user commands are input, and from which the television receives the signal for display. The user input device 12 has a few simple controls as required by the application, for example three select buttons and up/down/left/right shift controls or a joystick, and may be hard wired to the STB as shown in FIG. 1, or connected by infra-red (IR) link in known manner as in FIG. 2.

Figure 2:
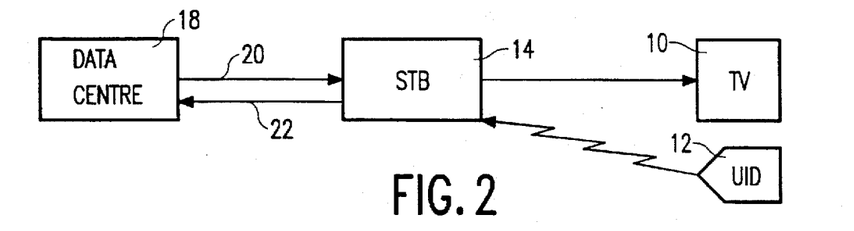
Figure 3:
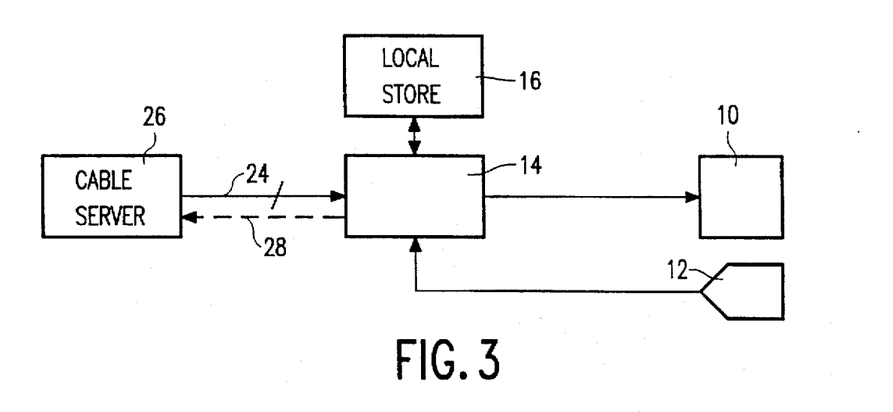
Figure 4:
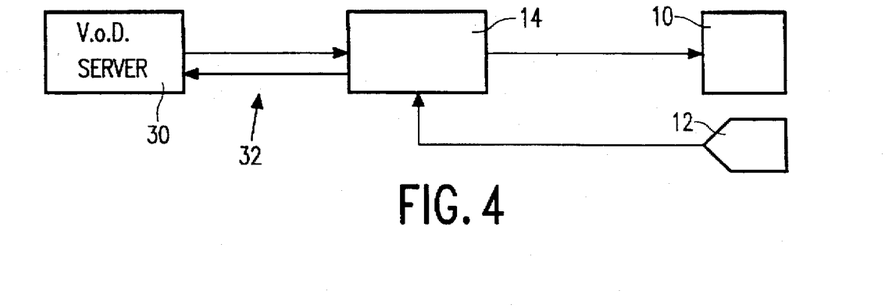

In the embodiment of FIG. 1, the narrative video and structure together with subsidiary information is supplied wholly from a local data source 16, such as a compact disc player or CD-ROM. In the embodiment of FIG. 2, the narrative video, structure and other information is supplied wholly from a remote source 18 via a data network 20, with user commands being sent to the remote source via a return path 22 of the network. In the embodiment of FIG. 3, the narrative video and other information is supplied as multiplexed channels on a single line 24 from a remote source 26, such as a cable television network server and is supplemented by information such as the structure from the local data source 16. In order to avoid the need for mass memory at the user site a return line 28 may be provided to give the user site at least partial control over the information sent out from the remote store, for example to enable the recall of identified portions of video out of sequence. In the embodiment of FIG. 4, the narrative is supplied via a Video on Demand (VoD) system from a server 30 over a network 32, access to which may require the user to enter an identification code or insert a smart card or similar into an appropriate card reader to enable decryption of encrypted signals. As will be described, rather than providing separate units for decryption and card reading, these functions may be provided within the STB.

Figure 5:
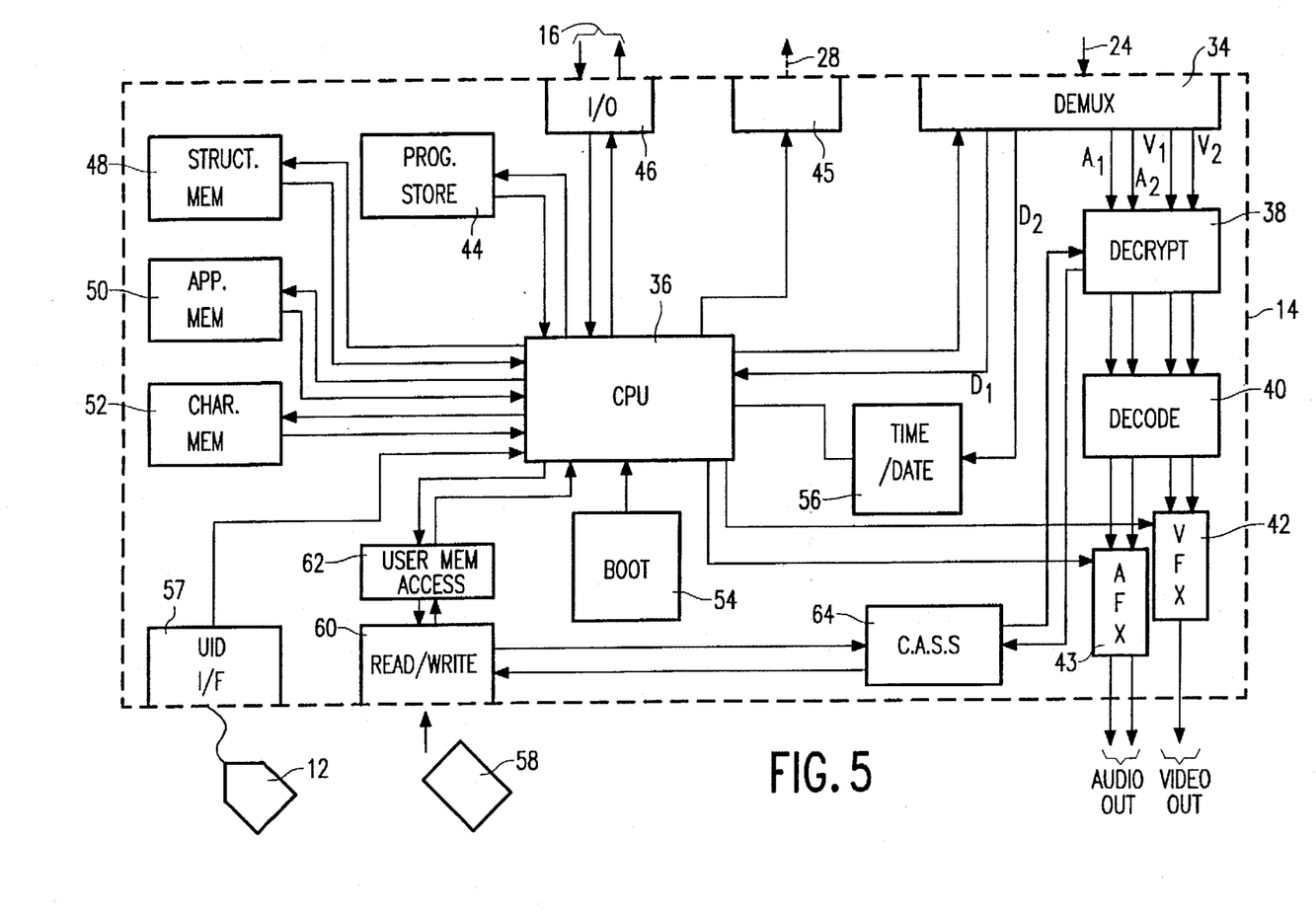
FIG. 5 is a schematic representation showing the user interface apparatus of FIG. 3 in greater detail.

FIG. 5 shows the internal structure of the STB 14 when set up for the configuration of FIG. 3, that is to say with input from both remote source 26 via network 24 and local source 16. The incoming signal from the network 24 contains a number of independent service components (audio, video and data streams) multiplexed together. In this example, the signal contains two data streams $D_1$ and $D_2$ the functions of which are explained below, together with two audio streams $A_1$ and $A_2$ (for example left and right channels of a stereo audio signal) and two video frame streams $V_1$ and $V_2$. The multiplexed signal is received by a demultiplexer 34 which splits it into the separate components under control of a processor 36. Before being output from the STB the audio and video may pass through decryption 38 and decoding 40 stages, the video signals may be processed 42 to provide video effects such as picture-in-picture (PIP), and the audio may also be treated 43, as will each be described below.

The first of the data streams $D_1$ is input to the processor 36 and contains program information specifying how the processor is to handle the audio and video streams and other information specific to features of the particular interactive narrative. This program information is held by the processor in program store 44. A specification for the branch structure of the narrative may be downloaded via $D_1$ (in response to a processor call on the network return path 28, via interface 45) or it may be read from local storage 16 via interface 46, with the processor sending track addressing and play commands as required. The branch structure is stored in structure memory 48, with further memories being provided for application features 50 and character features 52, the particular functions of which will be described below. Whilst shown in the Figure as separate stores, it will be readily appreciated that the program store 44 and the structure, application and character memories, 48, 50, 52 may be provided as respective areas of a single memory, provided that the more detailed addressing and associated access times for the larger memory do not unduly affect performance.

On powering up of the STB 14, a bootstrap loader 54 initialises the processor and instructs it to call for the branch structure and program information from the appropriate sources. Alternatively, and more simply, the boot strap loader 54 may just initiate the calling up of the program information, with the first instruction of that program information being for the processor 36 to call up the branch structure and store it in program store 44.

Some narrative applications may require information as to the current date and time of day and, to avoid the need for the STB to maintain an accurate, non-volatile, clock source, a time/data store 56 is provided, with the timing information being updated at regular intervals from the remote source using data component stream $D_2$ as shown. For the FIG. 1 embodiment, where there is no remote source, the data/time information might be obtainable from the local source if that maintained its own clock.

Signals from the user input device (UID) 12 are received by the STB at UID interface 57 and, from there passed to the processor 36. If, as in FIG. 2, the UID 12 is coupled to the STB via infra-red link, the interface 56 would include a suitable infra-red receiver.

For some forms of narrative entertainment, the narrative may be sporadic or episodic with the equipment being switched off in between episodes or sessions. To avoid the user being forced to re-start from scratch each time the equipment is switched on, a non-volatile user memory is provided in which features such as the user's current position within a narrative, user preferred system settings etc are stored. The user memory may suitably be held on a removable storage device such as a smart card 58 with the STB having a suitable card reader 60 with access to that area of the card storing the user memory being made via user access control 62: user memory access control 62 may, alternatively, be a purely software route executed within processor 36.

In some circumstances, the interactive entertainment may be provided by a remote server on a "pay-per-play" basis with the audio and video signals being transmitted in encrypted form and requiring particular key codes to enable them to be decrypted. In such a situation, the smart card 58 providing the non-volatile user memory may have a further function as a part of the decryption system. In such a case, the smart card 58 would carry a series of the codes, one or more of which would be required by decrypter 38 to decrypt the audio and video signals. Data stream $D_1$ would contain an identifier for one or more of the codes which identifier would be passed to a conditional access sub-system (CASS) 64, which in turn would use the identifier to address the stored codes on the smart card (via card reader 60) and, having obtained the necessary code or codes from the smart card, the CASS 64 would forward the obtained codes to the decrypter 38.

Where the video and/or audio signals are transmitted in compressed form, for example discrete cosine transform coded video according to MPEG standards, the decoder 40 may be provided. A switchable by-pass to the decoder (not shown) may be provided for the case where the display (television) is already equipped with, and set up for, decoding of the standard.

The video effects stage 42 is operated under control of the processor 36 to provide those features of the displayed image which are locally generated under the direction of the application program and/or user input, rather than being present in the video data supplied from the remote or local source. Such features may include menu bars, user movable cursors, system messages and so forth. As previously mentioned, one of the possible video effects is picture-in-picture (PIP) where the in-screen picture may be used to provide supplementary or future historical information about the narrative to the user. In one possible arrangement, video data streams $V_1$ and $V_2$ may synchronously show a particular scene of the narrative being played out, but with each being presented through the "eyes" of a different character within the scene, with the user having the chance, through operation of the UID, to select which viewpoint they watch from as the main screen image.

Where the narrative is composed of animated (rather than video) images, the effects stage 42 may handle the rendering of the images, with the remote source supplying the source and instruction data. Whilst this would require a significant increase in processing power for the STB, the user interaction could then include modification of the images themselves in addition to directing narrative branch point selection. As previously mentioned, the effects stage may also handle compound images, taking a video sprite and overlying it on a locally generated background image.

The audio effects stage 43 may be used for processing of the received audio signals $A_1, A_2$ in order to generate effects such as echo, without requiring supply and/or storage of multiple versions of an audio segment. The stage may also be used for local generation of some sound effects, suitably those required as immediate response to a user input, with basic waveform data, call commands and so forth being downloaded to the application memory 50 at the start of a session or on initialisation.

Figure 6:
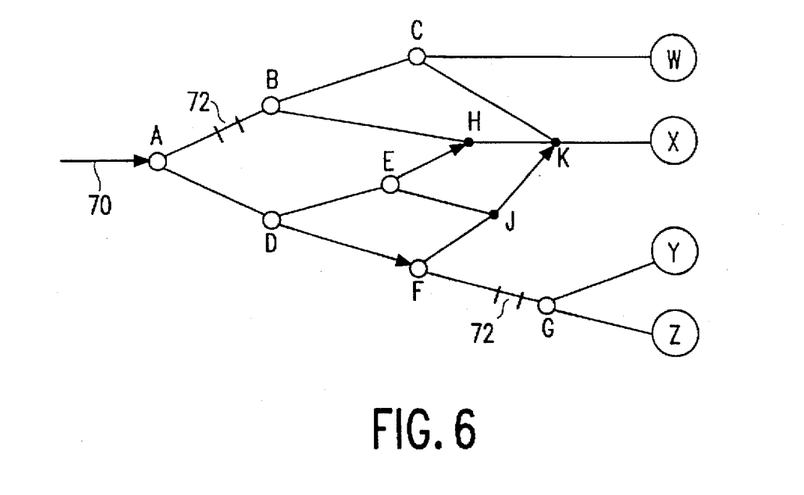
FIGS. 6 and 7 represent two differing forms of branch narrative structure.

Different forms of interaction with a narrative are possible, by use of the STB of FIG. 5 and using various of the facilities it provides, as required by the form of the narrative itself. FIG. 6 shows a branched narrative structure starting with a common introductory portion 70, which would serve to set the scene for the narrative, introduce the viewer to the characters and so forth. At branch nodes A to G a decision is required as to which path the narrative will take, with the user navigating through the network of possible story lines to reach one of the four possible endings W to Z. In order to avoid an "explosion" of possible endings, which would require a large amount of video data to be available for a relatively short narrative, some paths combine (at nodes H, J and K) such that some sections of the narrative (for example H to K) may appear within the narrative regardless of which path is chosen at node A for example. In order to maintain the user's "immersion" in the narrative story line it is important that, at both branching and combining nodes there is no discernable break in the video stream. Detailed techniques for seamless joining of video sequences are described in, for example, our co-pending United Kingdom patent applications 9424429, 9424436 and 9424437 (our references: PHB 33952, PHB 33950 and PHB 33951). A principal requirement for seamless joining is that the system has sufficient time to call up the selected next video segment and synchronise its start to the end of the present sequence. To enable this, a finite period prior to the end of the present video sequence is provided, for example as shown at 72 in FIG. 6, during which period the user may interact via UID 12 (FIG. 1). The location of the interaction periods 72 relative to the narrative is a feature of the structure, and is held in structure memory 48 of the STB (FIG. 5).

The existence of an interaction period may be indicated to the viewer in a number of different ways. For example, a menu of possible options may be displayed on the screen: this menu is preferably provided via the video effects unit 42 of the STB such that, as soon as the user has selected an item, the menu may be removed from the screen to minimise the intrusion. The positioning of the menu should be such as to avoid blocking the on-screen story and may be provided as, for example, a picture-in-picture or as a pull-up menu which the user can access during an interaction period.

Each branch node of the narrative is preferably provided with a default setting such that, if there is no user input during the interaction period 72, then the narrative will continue along the default path without stalling for lack of instruction.

The audio accompaniment to the video sequences of FIG. 6 is not tied to the video itself but instead is called up as a feature of the narrative structure. This enables sections of the audio (such as dramatic or background music) to be re-used during the course of the narrative, for example to provide an audio, rather than visual, cue to the user that interaction may take place or is required. As mentioned, some of the audio may also be locally generated.

Figure 7:
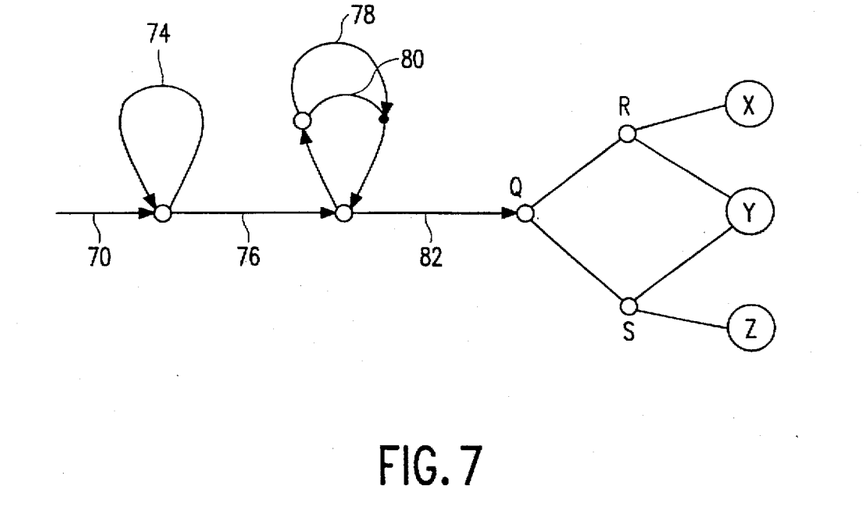

An alternative form for the branch structure is shown in FIG. 7. As before, the narrative starts with a common introductory portion 70 leading to a first branch node L. Instead of a diverging branch output, branch node L provides access to a narrative loop 74 which returns to node L at its end, following which the narrative continues along path 76 to another branch node M. The narrative loop 74 may be used to enable the viewer to access background or subsidiary information to the narrative: the default setting for node L would be to continue with narrative section 76. At node M, a further narrative loop is provided having within that loop a further branch node N and recombining node P linked by two possible loop narrative paths 78 and 80. Multiple loop nestings, as well as loops within loops may be provided. As shown, the narrative loop structure may be combined with a diverging branch structure, with diverging branch node Q following narrative section 82 and further branch nodes R and S leading to conclusion of the narrative at one of three possible endings X, Y or Z.

Figure 8:
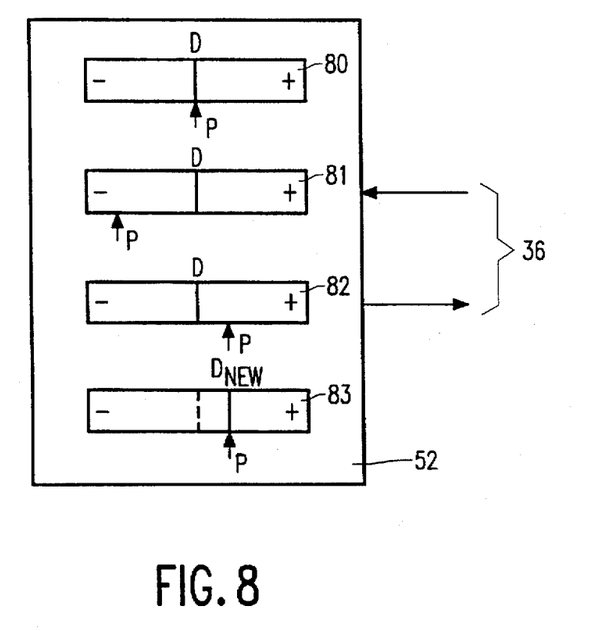
FIG. 8 schematically represents the function of the character memory in the interface apparatus of FIG. 5.

In order to reduce intrusion, and to maintain the "inertia" of the narrative flow, path selection at one or more of the branch points is dependent on previous interactions. FIG. 8 schematically represents how the character memory (52, FIG. 5) may be arranged to provide the historical information. A number of "sliders" (in the form of up/down counters) 80 to 83 are provided, each having a movable point P and a central default value D. On initialisation of the system, each of these sliders is given a start value and is assigned to a respective character or feature of the narrative, which characters or features will have an effect on the selection at at least one branch point during the course of the narrative. From initial settings at the default value D (or possibly a different user-set value) the pointers will be moved up or down the scale as interactions related to that character take place. Using the narrative structure of FIG. 7, for example, the character "values" associated with each branch of the narrative prior to branch node Q may be as follows:

| Path | Value |
|------|-------|
| 70 | +1 |
| 74 | −4 |
| 76 | +2 |
| 78 | −2 |
| 80 | +2 |
| 82 | −1 |

The decision at branch node Q may then be set such that, if the accumulated character total (the pointer position) is greater than or equal to 0 then the path to node R will be followed, otherwise the narrative will proceed to node S. By following the default path of narrative sections 70, 76 and 82 (that is to say avoiding the loops) a pointer setting at +2 is achieved and the narrative will continue to node R. However, if the user chooses to enter loop 74 at node L, the narrative will proceed to node S unless the user has chosen also to go via narrative section 80 in the loop at node M.

In addition to the narrative sequence character values, the branch nodes themselves may have an effect on the stored character values, for example incrementing, decrementing or resetting to the default values. Also, the default values themselves may be movable with, for example, consistent or extreme pointer positioning on one side of the default leading to gradual movement of the default towards that side.

Rather than wholly automatic selection on the basis of accumulated character totals, this feature may instead be used to selectively lock or unlock certain paths of a narrative. The decision at branch node Q would then be available to the user only if they had accumulated sufficient character values earlier in the entertainment, and the "unlocked" branch might contain scenes where the character appears to address the user in a familiar manner, or scenes of personal revelations from characters in situations where insufficient character values have been accumulated, the system may react to user-directed selection of a locked branch with a displayed and/or audio message (generated through video and/or audio effects stage 42,43) such as "Path Closed" to alert the user to the need to take different pathways on the next play of the entertainment. Alternatively, where only one unlocked path is available from a node, the visual and/or audio cues to the user to interact may suitably be suppressed and the unlocked path automatically selected as a default, such that the chance to interact may come as a surprise to the user on a subsequent playing.

Where the entertainment is episodic, the user is preferably provided with a chance to save settings at the end of a session. This would a record of current point settings to be stored on the smart card 58 and, rather than setting the pointers to default, the initialisation stage would reset them to their previous values at the start of the next session.

Figure 9:
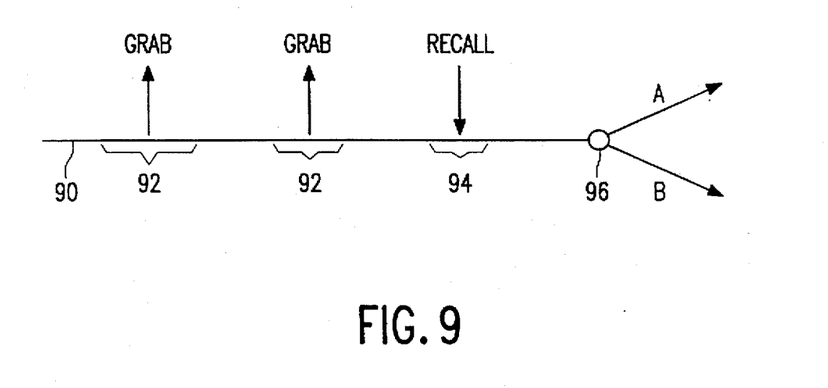
FIG. 9 represents a further form of branch narrative structure.
Figure 10:
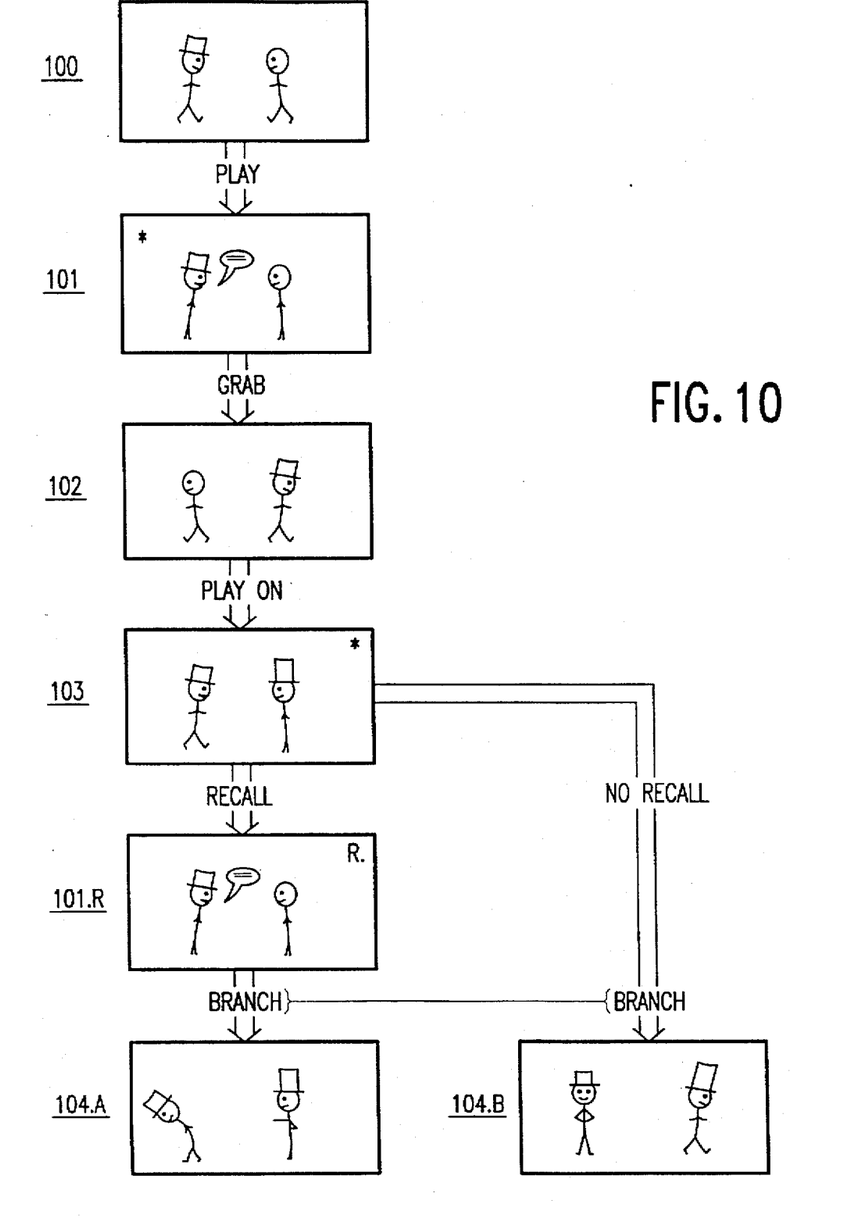
FIG. 10 is an example image sequence following the interactive narrative segment of FIG. 9.

A further form of interaction which may be supported uses both the character memory 52 and the application memory 54 of the STB and involves "grabbing" of information from the narrative, as shown in the narrative structure schematic of FIG. 9 and the picture sequence of FIG. 10. During a narrative sequence 90, one or more interaction periods 92 are provided during the course of which the user is enabled, on operation of the UID, to capture information relating to that part of the narrative. At a subsequent interaction period 94, the user can reintroduce the captured information to the narrative such as to affect the choice of narrative branches A or B following the next branch node 96.

In the example of FIG. 10, the initial scene 100 has two characters (Fred and Barney) approaching in the street. This is part of the running narrative with which the user cannot interfere.

In the next scene 101, they are conversing and Fred is saying that he told his boss that he was not at work the previous day because he was ill, when in fact he went to a party. This potentially useful piece of information may have later relevance to the story and, whilst the conversation is taking place, the user is alerted to the fact that an interaction period is currently open by an audio cue or an on-screen indicator such as the asterisk shown in the top left corner of the picture: the asterisk may suitably be generated by the STB video effects stage 42.

If the user decides to grab the information (which would simply require operating a "Capture" button on the UID), the source address for that video sequence would be written to the application memory to enable its subsequent recall. Additionally, a shrunken still image or some other visual reminder of the captured scene is generated.

In scene 102, Fred and Barney have concluded their conversation and go their separate ways. As the asterisk is not present, the user is alerted that this scene cannot be captured. The still picture reminder of the captured scene is shown at the bottom right corner of the current scene: this may not be the case however, particularly if it proves intrusive. Instead, the reminder pictures might only appear on screen at times when they may be required, or they might be provided in a pull-up or pop-out menu.

In scene 103, Fred is talking to his boss. This scene is another interaction point, but this time the user may recall captured scenes rather than capture further ones: this is indicated to the user by an asterisk in the top right corner of the screen. Where a number of scenes have been captured, they may be separately identified by, for example, the numbers 1-3 with the user entering the appropriate number via the UID to recall that scene.

If the user decides to recall the scene where Fred was talking to Barney, the selection of that scene will cause the STB processor 36 to read the source address for that scene from the application memory 50 and use it to call up the scene in question from the remote or local source as appropriate. The recalled scene 101.R then replaces the current one, providing a "flashback" of Fred's conversation with Barney.

The operation of recalling moves the narrative sequence along to the next branch node (96, FIG. 9) and the content of the recalled sequence may directly or indirectly affect the choice of branch. In a direct implementation, the recall of scene 101 at this point automatically selects branch A, in which Fred is fired for taking the day off: if the user chooses not to recall the scene during the interaction period of scene 103, that scene plays itself out until the branch point is reached, when branch B is followed and Fred keeps his job.

In an indirect implementation, one of the sliders in the character memory 52 (FIG. 8) may be assigned as "Fred's Job Prospects" on initialisation. If, during the course of preceding interactions, the character of Fred has accumulated a large positive value on this slider, the negative value associated with recalling scene 101 in the presence of Fred's boss may not be sufficient to generate a negative value for the slider at the branch decision point and Fred may still keep his job.

In an alternative implementation, the flashbacks may be purely audio with, for example, scene 103 entering a short (audio-muted) loop, being frozen, or being wholly or partially replaced by a still from scene 101 whilst the conversation audio from scene 101 is replayed. The option taken from the foregoing will to some extent depend on the form of the narrative. For example, "unfreezing" and continuing scene 103 following the flashback will be inappropriate if Fred's boss continues to talk to him as though unaware of the flashback; then suddenly (at the branch point) turns around and fires him. Entering a loop section may be appropriate if, for example, the interaction point is set to coincide with Fred's boss answering a telephone call during scene 103. The image of Fred's boss on the phone may be looped for 5 seconds for example and then continue to the branch point: scenes 104A and 104B would both commence with Fred's poss putting the phone down and, if the audio flashback has been recalled during the loop, scene 104A proceeds with the boss acting as if he had heard about Fred's day off over the telephone. If no recall has occurred, scene 104B proceeds with the boss acting as though the telephone call had been an inconsequential matter.

The flashback image or audio sequence may be a specially recorded sequence, which may be particularly useful where the original scene was lengthy with the flashback acting as an edited "highlight". The flashback play is suitably presented in such a way as to differentiate from conventional play; video may be presented in a smaller area of the screen and/or with some arrangement of border generated by the video effects unit 42, and audio may be provided with echo and muting effects or with the accompaniment of a particular piece of backing music through audio effects unit 43.

Storage for flashback sequences may suitably be tied to that of the original sequence, with each flashback stored at an address location corresponding to that of the original but offset by constant value, such as to simplify calling of the sequence. Alternatively, the flashback sequences may be stored separately with a separate address table downloaded to the apparatus along with the main table for the narrative sequences, or each sequence capable of capture may be accompanied by data (for example on data channel $D_1$) identifying the address for the flashback sequence.

In order to further control the screen and memory space associated with a captured scene, a limit is placed on the number of scenes which may be held at any time. When that limit is reached, the user may be prevented from capturing further scenes until one of those stored has been recalled or deleted. Alternatively, capturing a scene where the limit has already been reached may be the trigger for the system to automatically delete the "oldest" stored scene. Thus, in addition to the user being required to select when to recall a scene, they would also have to use their skill and judgment to decide which scenes would be most useful to capture.

In order to provide a lower degree of interactivity for those that desire it, a limited selection of choice may be provided beyond the running of a single default path, with the user having the simple option of "grab" or "default" at each interaction point, and each captured sequence being keyed to replay at a particular point. This is accompanied by automated selection at branch points following replay. With such an arrangement, the user simply chooses to go off the default path from time to time with the system triggering and following the consequences.

Figure 11:
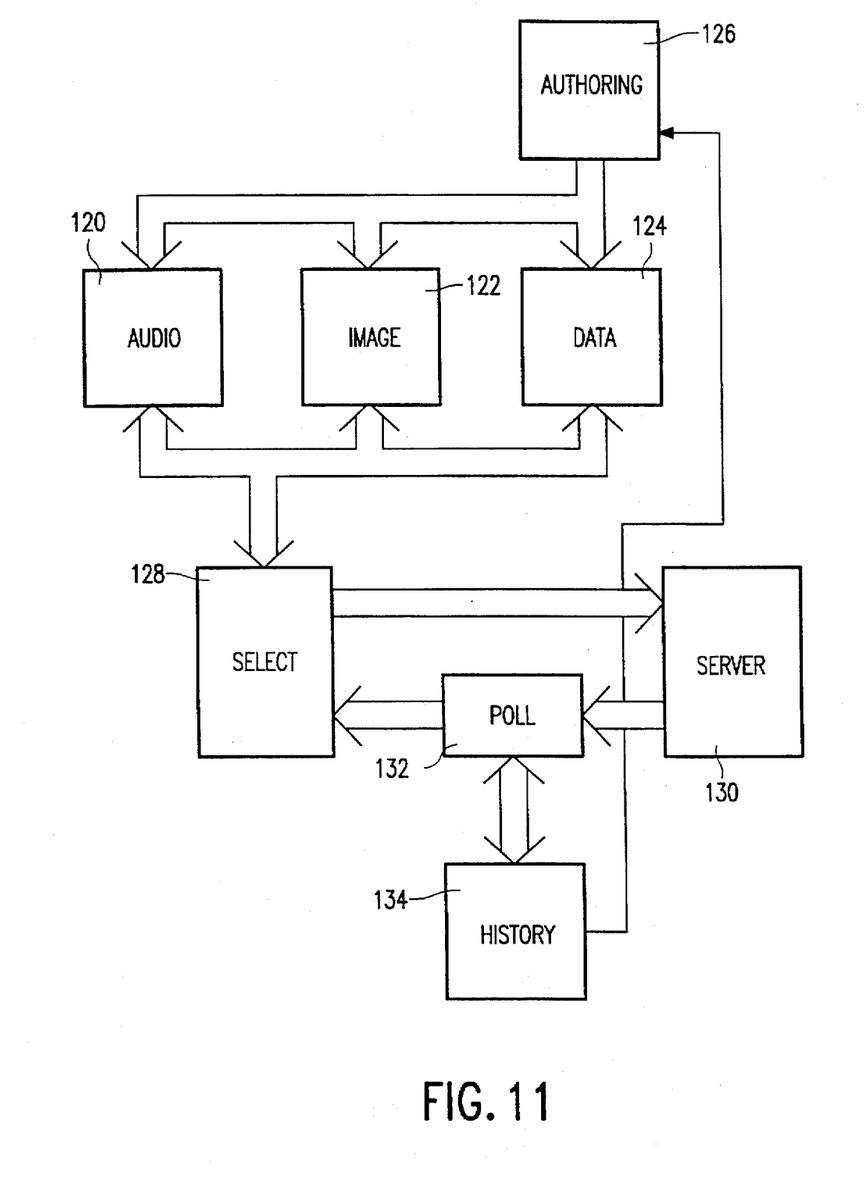
FIG. 11 schematically illustrates a remote data source for supplying image data to the interface apparatus of FIG. 5.

A remote source apparatus for providing the narrative entertainment to a number of users is illustrated schematically in FIG. 11. Stores of audio 120, image (video or animation) 122 and source 124 data hold the basic components of the interactive entertainment. These may just be loaded once with a complete narrative or, where the narrative is episodic (such as a soap opera) they may be updated on a regular basis via authoring suite 126.

A source select unit 128 combines the required audio, image and data components to a signal which is sent out to remote users over a network and via a network server 130. The network server also receives user responses at interaction periods via return paths of the network and passes these to a response polling unit 132. Where the system has the capability to handle individual requests (i.e to allow non-synchronised play of the narrative entertainment by the different users), the response polling unit 132 simply passes a data request to the source select unit 128 identifying which audio, image and/or data components are to be passed to which user. A record of the request is passed to a history store 134.

Where the system provides the entertainment as a broadcast, requiring all users to participate together, the branch selection may be made by majority vote, with the response poll section 132 collating the received user requests. In order to maintain the narrative inertia, a weighting factor based on past interactions may be generated from the history store, with the weighting factor applied to the requests cast before the selection is made.

Where the entertainment is incrementally generated through the authoring suite 126, the suite may be provided with means for generating schematics corresponding to the current storyline, with an indication (derived from history store 134) of the relative popularities of different branches of the story. With this facility, the author's task of determining which parts of the narrative may be deleted and which parts should be extended or combined is greatly simplified.

From reading the present disclosure, other modifications and variations will be apparent to persons skilled in the art. Such modifications and variations may involve other features which are already known in the art and which may be used instead of or in addition to features already described herein. For example, some of those features described in relation to the STB (14, FIGS. 1 to 5) may instead be provided within a personal computer and others within a television or display unit. The reference to an apparatus in the following claims will be readily understood to cover all arrangements where the various recited features operate together in the manner described, regardless of whether those features are provided in a single unit or distributed amongst a number of interconnected units.

Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

What is claimed is:

1. Interactive entertainment apparatus operable to output sequences of image frames comprising a user-influenced path through a branch structured narrative, the apparatus comprising:

a source of image frames for all branch structure paths of the narrative;

branch storage means for data defining the narrative branch structure;

user operable input means;

branch selection means coupled to the branch store and operable to detect narrative branch points and to call one of two or more image frame sequences from the image frame source in dependence on the user input;

an output for the selected image frame sequences; and interaction memory means arranged to receive and store data relating to user input, the branch selection determining which of said two or more image frame sequences to call on the basis of at least two preceding and separate user inputs.

2. Apparatus as claimed in claim 1, wherein said interaction memory means comprises a non-volatile storage device.

3. Apparatus as claimed in claim 2, further comprising a smart card reader operable to access data stored in a memory of a smart card and to write data thereto, wherein said interaction memory means comprises said memory of said smart card.

4. Apparatus as claimed in claim 3, wherein said received image data is in encrypted form and requires one or more key codes for decryption thereof, wherein said key code or codes are stored on said smart card, and the apparatus further includes decryption means coupled to receive the encrypted signal and connected to access key code or codes on the smart card through the smart card reader.

5. Apparatus as claimed in claim 1, further comprising image generating means operable to generate and output image frames on the basis of received data from said image frame source.

6. Apparatus as claimed in claim 5, wherein said source of image frames provides sequences of video frames and said image generating means is operable to generate image artefacts overlying one more of the video frames when said frames are displayed.

7. Apparatus as claimed in claim 5, wherein said source of image frames provides animation source data and said image generating means is configured to generate and render successive animated image frames in accordance with said source data.

8. Apparatus as claimed in claim 1, wherein said source of image frames comprises a remote source coupled to said apparatus via a data transmission network, and said apparatus is operable to generate and send messages requesting image data via said network.

9. Apparatus as claimed in claim 8, wherein said remote source provides image frames and ancillary data in multiplexed arrangement on a single channel of the network, the apparatus further comprising a demultiplexer arranged to receive signals from said network channel and separate the respective components thereof.

10. Apparatus as claimed in claim 8, wherein a further data source is provided local to the apparatus and said apparatus is operable to control the accessing of data therefrom.

11. Apparatus as claimed in claim 1, wherein said source of image frames comprises an optical disc accessed via a disc reader, and said apparatus is further operable to control access of data from the disc by the reader.

12. A smart card for use with apparatus as claimed in claim 2, the card including a write/read memory area including said interaction memory.

13. An optical disc for use with an apparatus as claimed in claim 11, said disc carrying data defining the narrative structure, a plurality of image frame data segments arranged on the disc at predetermined locations and an addressing table specifying to the apparatus access addresses for each image frame data segment.

14. An interactive entertainment source apparatus operable to supply image frames to one or more apparatuses as claimed in claim 1, said source apparatus including means for monitoring and logging apparatus frame sequence calls for branch points of the interactive entertainment, means for determining the frame sequence to be sent on the basis of said frame sequence calls, and transmission means operable to transmit selected ones of the frame sequences.

15. A source apparatus as claimed in claim 14, comprising counter means arranged to determine numbers of requests for each particular one of alternate possible frame sequences, and the transmitted one of those frame sequences is determined by majority vote.

16. A source apparatus as claimed in claim 15, wherein said means for monitoring and logging maintains a record of two or more past branch point interactions and includes arithmetic means operable to generate a weighting factor based thereon, said weighting factor being applied to vote shares prior to determination as to which frame sequence is transmitted.

17. A method for control of an interactive entertainment apparatus, where the apparatus presents to the user a branch structured narrative, and user input determines which path is followed at at least one narrative branch point, characterised in that, a history of user interactions is maintained and determination as to which path is followed at said at least one narrative branch point is made on the basis of two or more preceding and separate user interactions.

18. A method as claimed in claim 17, wherein a history is maintained for a predetermined number n of preceding user interactions, with the most recent n interactions forming said history.

19. A method as claimed in claim 17, wherein user interactions are classified into two or more categories, a history is maintained for each category, and each branch point of the narrative specifies the category on the basis of which path selection is to be made.

20. A method of supplying an interactive narrative entertainment comprising the steps of:

providing a branch structure for the narrative;

making available sequences of image frames for each path of the branch structure;

logging user requests for image frame sequences; and for each branch point for which one or more requests are made, determining which sequence is sent at least partially on a historical record of user interactions, and at least partially on the basis of the number of requests received.

* * * * *